United States Patent Office 3,471,892
Patented Oct. 14, 1969

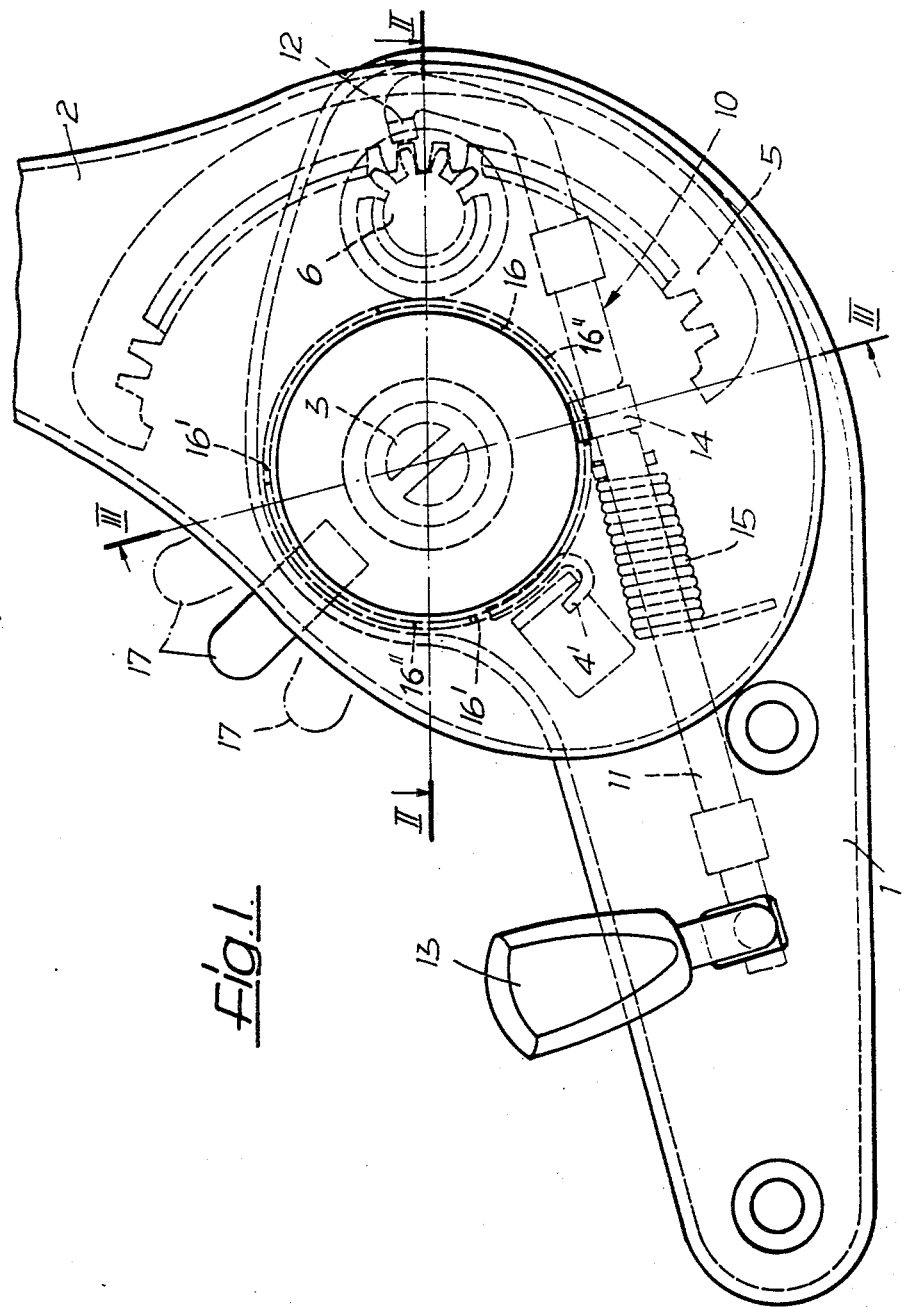

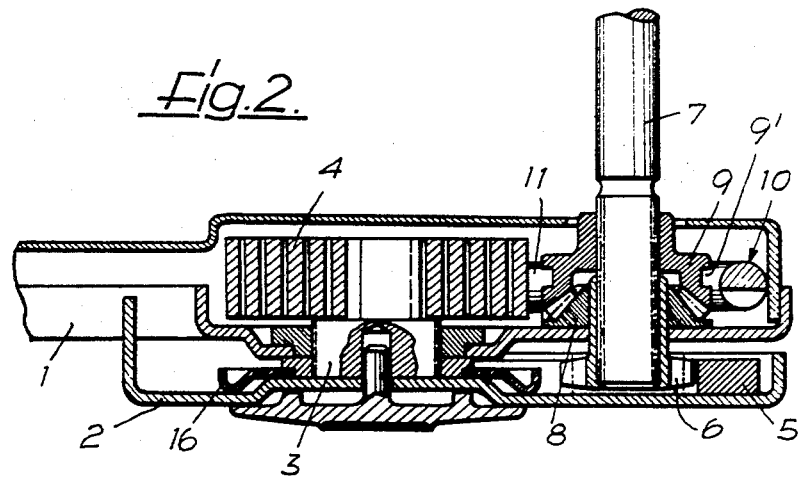
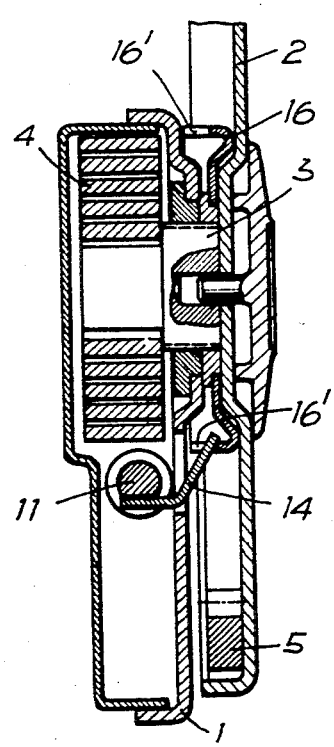
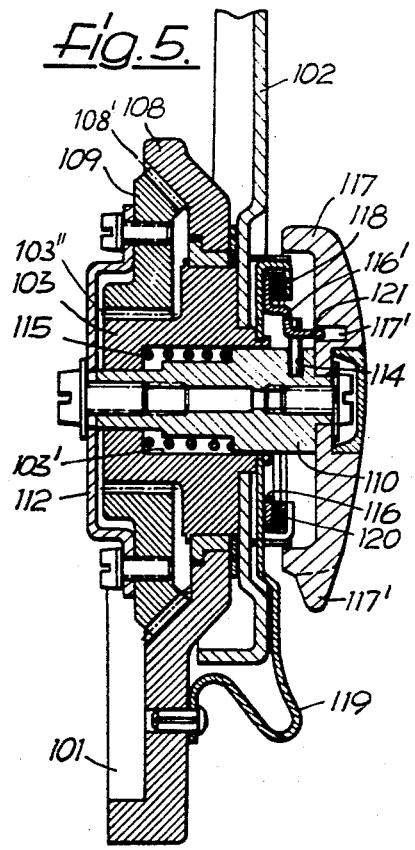

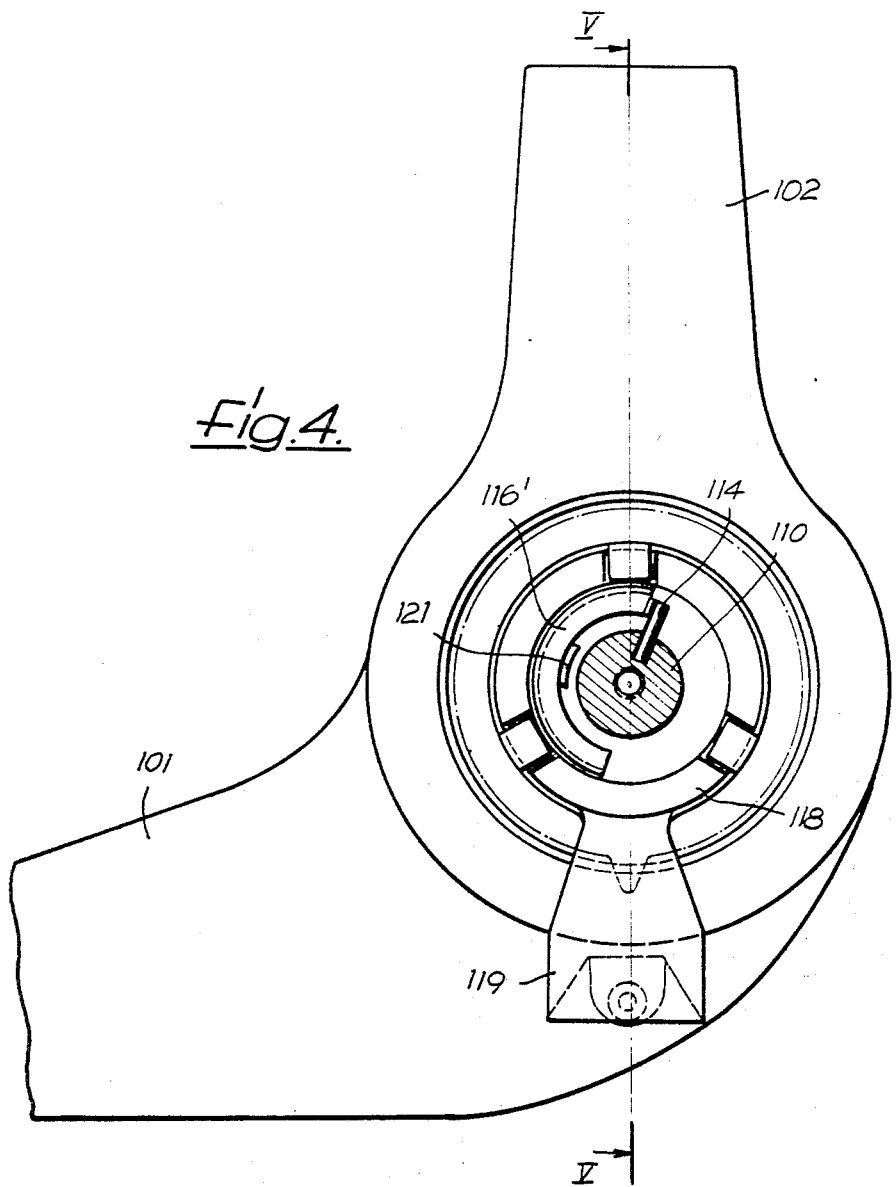

3,471,892
HINGE FITTING FOR A SEAT AND BACK REST
Jörg Resag, Stuttgart-Degerloch, and Wolfgang Fussnegger, Stuttgart, Germany, assignors to Recaro A.G., Glarus, Switzerland, a corporation of Switzerland
Filed July 15, 1966, Ser. No. 565,451
Claims priority, application Germany, July 17, 1965,
R 41,113
Int. Cl. E05d 11/10; A47c 3/00
U.S. Cl. 16—139                    8 Claims

ABSTRACT OF THE DISCLOSURE

A hinge fitting for adjusting the inclination of the back rest of a seat, especially of a motor vehicle, which comprises, in combination a first and a second hinge member adapted to be secured to one side of the seat and back rest, respectively, and a pivot member is provided for pivotably connecting the hinge members to each other. Means are arranged for locking the hinge members in a fixed position at different angles to each other, which means comprise a pair of locking members, resilient means for normally maintaining the locking members in a locking position in locking engagement with each other. A first of the locking members is rigidly secured to the first hinge member, the second locking member is operatively connected to the hinge members, and a manually operated actuating member is arranged for moving the second locking member against the action of the resilient means from the locking position, in which the second locking member is in engagement with the first locking member, to a releasing position in which it is disengaged from the first locking member. A latching mechanism is adapted to arrest the actuating member in its releasing position when the back rest while being pivoted enters an adjustable range forming a part of its total distance movement.

The present invention relates to a hinge fitting for adjusting the inclination of the back rest of a seat, especially of a motor vehicle, which comprises a pair of hinge members which are adapted to be secured to one side of the seat and back rest, respectively, and are pivotably connected to each other and provided with suitable means for locking them in a fixed position at different angles to each other. These locking means comprise a pair of locking members which are normally held by resilient means in a locking position in locking engagement with each other. A first of these locking members is rigidly secured to one of the hinge members, while the second locking member is operatively connected to the other hinge member and movable by means of a manually operated actuating member against the action of said resilient means from the locking position, in which it is in engagement with the first locking member, to a releasing position in which it is disengaged from the first locking member. The hinge fitting further comprises a latching mechanism which consists of a pair of operatively associated latch members which are movable at an angle to each other and one of which is operatively connected to the manually operated actuating member. These latch members are adapted to arrest the actuating member in its releasing position when the back rest while being pivoted in one or the other direction enters an adjustable range which forms a part of its total distance of movement. When the back rest is moved in the direction opposite to that in which it was previously moved when the latch members arrested the actuating member, and as soon as it leaves the mentioned range, the latch members will release the actuating member so as to permit the latter under the action of the resilient means to lock the two locking members and thus the two hinge members in a fixed position to each other. The hinge fitting further comprises a control member which, when the back rest is being pivoted for a certain distance, is moved by suitable transmitting means for a distance in proportion to the mentioned distance of the pivoting movement of the back rest.

There are hinge fittings known of the above-mentioned type which are adapted to lock the back rest in any desired inclined position and are provided with associated latch members which are adapted to arrest the manually operated actuating member in its releasing position when the back rest is pivoted beyond its most forward locking position, for example, for the purpose of permitting a passenger of a two-door car to enter the rear part thereof and to sit down on one of the back seats. For again releasing the actuating member from its latched position, it is necessary to pivot the back rest to a certain fixed position in which the latch members are disengaged from each other by a stop member which is secured to the hinge member for the back rest. These hinge fittings have the disadvantage that the back rest will not be locked in its original inclined position to which it was previously adjusted by the operator, but in the mentioned fixed position. If the back rest is to be arrested at any other inclination than that of the fixed position, the back rest must after each pivoting movement be newly adjusted by the operator from the fixed position to the desired inclined position. Furthermore, it is disagreeable that the operator of one of these hinge fittings must hold the actuating member in the releasing positon until the back rest has been pivoted beyond its most forward locking position.

It is an object of the present invention to provide a hinge fitting of the general type as described above which is equipped with a latching mechanism which is of a simple, inexpensive and compact construction and adapted after the back rest has been pivoted to arrest the same in its original inclined position. According to the invention, this object is attained by connecting one of the latch members to the control member and by designing one or the other latch member so as to be connected to one of the two hinge members and to be movable by means of a control handle in the same direction in which, when the back rest is pivoted, at least one of the two latch members will also be moved.

It is the basic concept of the present invention that the latching mechanism may be made of a very simple construction if during the pivoting movement of the back rest a first of the two latch members will be moved in proportion to the pivoting movement of the back rest and if this latch member will thereby interengage with the second relatively immovable latch member. Since the first latch member is also movable by means of the control handle, it is possible to adjust the relative position of the latch elements in any position of the back rest so that the actuating member will be latched in its releasing position almost as soon as the pivoting movement of the back rest is started. If the actuating member is to be unlatched so as to lock the hinge members when the back rest arrives in its original inclined position, during its pivoting movement in the direction opposite to that in which it was previously pivoted, the first latch member only needs to carry out a movement in proportion to this pivoting movement. This is attained according to the invention by combining one of the latch members with the control member. Thus, there are only two parts necessary for latching and unlatching the actuating member, namely, the control member which is combined with one latch member and the other latch member. These parts require very little space and may be made of a very simple construction.

Another advantage which is attained by the new hinge fitting is the fact that for adjusting the back rest it is only necessary to hold the actuating member in its releasing position until the back rest has been pivoted for a short distance since due to the adjustability of the relative position of the latch members the latch member which is associated with the actuating member will then be held or arrested by the other latch member.

A very important and advantageous feature of the invention is the fact that it permits a new back-rest position to be selected while the back rest is still held in another position. This is attainable by moving the control handle for the desired distance so as to shift the latch member accordingly which is connected to one of the hinge members. The back rest may also be locked in its original position after it has been pivoted back, for example, to the reclining position.

The hinge fitting according to the invention may in particular be designed so that one of the latch members forms a ring which is secured to a rotatable disk and provided with at least one peripherally extending gap, while the other latch member forms a finger which projects from one side into the gap when the actuating member is in its releasing position and is held in engagement with the free edge of the ring when the actuating member is in its locking position. In order to make the latch mechanism of a very simple construction, it is advisable to mount the rotatable disk carrying the ring so as to be disposed concentrically to the hinge axis.

According to one preferred embodiment of the invention, the mentioned disk forming one latch member is mounted so as to be in frictional engagement with the hinge member which is to be secured to the back rest, while the ring is of a cylindrical shape and secured to or integral with this disk and projects toward one side thereof. The disk is further provided with a control arm for adjusting it together with the ring and the gap therein to different rotary positions. Due to the frictional connection between the disk and the hinge member for the back rest, the disk and ring will be turned about the hinge axis in accordance with the pivoting movement of the back rest. By turning the disk relative to the hinge member despite its frictional engagement therewith, it is possible to preselect a new back-rest position while the back rest is still held in a fixed position. The actuating member of this embodiment of the invention is provided in the form of a shift rod which is rotatably mounted on the hinge member for the seat and one end of which is bent over and engages with one of the locking members for shifting the same into and out of engagement with the other locking member when the shift rod is manually turned about its axis by a handle on its other end. The other fingerlike latch member of this embodiment is provided in the form of a radial projection on the shift rod which is movable in a direction substantially vertical to the outer edge of the cylindrical ring and adapted to engage upon this edge or into a gap of this ring.

Another preferred embodiment of the invention provides that the fingerlike latch member projects radially from the actuating member which is disposed concentrical to the hinge axis and movable in its axial direction. This actuating member which may be mounted within a central bore in the axle or pivot pin of the hinge fitting is nonrotatably connected to the hinge member which is to be secured to the back rest. Thus, when the back rest is pivoted, the finger will swing about the same angle as the back rest. The other latch member is provided in the form of a disk which is disposed concentrically to the hinge axis and in frictional engagement with a part, for example, an annular plate, which is rigidly secured to the hinge member for the seat. In order to permit the actuating member to be easily manipulated and the disk to be easily turned to the desired position, the invention further provides the outwardly facing end of the actuating member with a handwheel which is rotatably mounted thereon and nonrotatably connected to the disk. For operating the latch mechanism, the operator therefore does not need to press directly upon the rotating actuating member but upon the smooth handwheel which also has the advantage that it permits the disk to be very easily turned for adjusting it to a newly selected or preselected angular position of the back rest.

The features and advantages of the present invention will become more clearly apparent from the following detailed description thereof which is to be read with reference to the accompanying drawings, in which—

FIGURE 1 shows a side view of a hinge fitting according to the invention;

FIGURE 2 shows a cross section which is taken along the line II—II of FIGURE 1;

FIGURE 3 shows a cross section which is taken along the line III—III of FIGURE 1;

FIGURE 4 shows a side view of a hinge fitting according to a modification of the invention from which the handwheel is removed; while FIGURE 5 shows a cross section which is taken along the line V—V of FIGURE 4, but includes the handwheel and shows the locking members in the locked position.

In the drawings, FIGURES 1 to 3 illustrate a hinge fitting according to the invention for a seat and associated back rest (not shown) of a motor vehicle. This hinge fitting comprises a lower hinge member 1 which is to be secured to one side of the seat and an upper hinge member 2 which is to be secured to the same side of the back rest and is pivotably connected to the lower hinge member 1 by means of a pivot pin 3, which is rigidly secured to the upper hinge member 2. A return coil spring 4 is secured at one end to the axle or hinge pin 3 and at the other end 4' to the lower hinge member 1 and tends to pivot the upper hinge member 2 forwardly.

For locking the back rest in any desired inclined position, the upper hinge member 2 is provided with a segmental rack 5 which is constantly in mesh with a pinion 6 which is rotatably mounted in the lower hinge member 1 and rigidly secured to a shaft 7. This shaft 7 is rigidly secured to the corresponding shaft of the other hinge fitting, not shown, which is to be provided on the other side of the seat and back rest.

Shaft 7 is rotatably mounted in the bore of a first locking member 8 in the form of a bevel gear which is rigidly secured to the lower hinge member 1 and provided with a set of bevel teeth. A second locking member 9 which is axially slidable on shaft 7 but nonrotatably relative thereto is provided with a set of corresponding bevel teeth which may be engaged with and disengaged from the teeth on the first locking member 8 when the second locking member 9 is shifted in the axial direction by means of a locking lever 10.

As illustrated in FIGURES 1 and 3, the actuating member 10 consists of a shift rod 11 which is mounted on the lower hinge member 1 so as to be rotatable about an axis extending at right angles to the axis of pivot pin 3. One end of this rod 11 is bent over and forms a tooth 12 which engages into an annular groove 9' in the second locking member 9, while its other end is provided with a handle 13 extending at a suitable angle to rod 11. A coil spring 15 on rod 11 exerts a torque upon the shift rod 11 which serves as a control member for operating the locking mechanism. This torque maintains the second locking member 9 in interengagement with the first locking member 8 when the handle 13 is released.

The hinge fitting which is to be provided on the other side of the seat is of the same construction as the hinge fitting as described, except that it does not have any actuating member and any locking members.

For latching the shift rod 11 in its releasing position, in which the locking members 8 and 9 are disengaged from each other, a radially projecting finger 14 is rigidly secured to rod 11 and forms the first of two operatively associated latching members of a mechanism for maintaining the shift rod 11 in its releasing position. The second latching member, as shown particularly in FIGURE 3, consists of a disk 16 which is rotatably mounted on the hinge pin 3 and in frictional engagement with the upper hinge member 2. The outer edge of disk 16 is bent over so as to form a cylindrical ring which is divided by a pair of slots 16″ to form two ring segments 16′. As illustrated in FIGURE 3, the diameter of disk 16 and the axial length of the ring segments 16′ are made of such sizes that, when the shift rod 11 is in its releasing position, finger 14 will project into one of the two slots 16″ between the ring segments 16′. When finger 14 is in this position, disk 16 will be capable of turning only until a lateral edge of one of the ring segments 16′ extending in the axial direction of the latter abuts against the finger 14. However, when the shift rod 11 is in its locking position by the action of spring 15, finger 14 is pivoted out of the slot 16″. When finger 14 is in this position, disk 16 may be turned so as to slide one of the two ring segments 16′ underneath the finger 14 so that, while the handle 13 is not actuated, this finger will engage upon the front edge of the ring segment and will thereby hold the shift rod 11 in its releasing position. The frictional connection between disk 16 and the upper hinge member 2 is so strong as to insure that, when the upper hinge member 2 is pivoted and the finger 14 is held in the releasing position by one of the two ring segments 16′, disk 16 will be taken along by hinge member 2 without slipping relative thereto.

As illustrated in FIGURE 1 disk 16 carries a control arm 17 which projects radially in the outward direction through one of the two slots 16″ and permits the disk 16 to be turned relative to the upper hinge member 2.

If the back rest is to be pivoted forwardly, for example, from the position as shown in FIGURE 1, handle 13 is to be moved so as to turn rod 11 about its axis and thereby move the second locking member 9 out of engagement with the first locking member 8 and also move the finger 14 out of the slot 16″ between the two ring segments 16′. When the back rest is then pivoted forwardly about a certain angle, disk 16 will be turned about the same angle in the counterclockwise direction. Since the front edge of the ring segment 16′ adjacent to finger 14 will pass underneath the latter as soon as the back rest is pivoted, handle 13 may be released after being actuated only for a moment. The latching action by the finger 14 and the ring segment 16′ prevents the finger from pivoting back from its releasing position to its original locking position. When the back rest is pivoted back, it will therefore always be arrested in its original position regardless of how far it has been pivoted forwardly since disk 16 serving as a control member will always turn about the same angle about which the back rest is turned. Therefore, when the back rest is being pivoted back, the ring segment 16′ will release the finger 14 in the same inclined position of the back rest in which the latter was previously held and will thereby permit the locking members 8 and 9 to interengage with each other.

If the back rest is to be adjusted to a position more toward the rear of the present position, it is only necessary to actuate the shift rod 11 and to pivot the back rest toward the rear. During this pivoting movement, disk 16 will be turned in a clockwise direction, as seen in FIGURE 1. Since there is a gap or slot 16″ between the two ring segments 16′, shift rod 11 will not be locked at this pivoting movement, so that for securing the back rest in the new position, it is only necessary to release the handle 13 on shift rod 11. In order to insure that after the back rest is again pivoted forwardly, for example, for permitting a passenger of a two-door car to get into a back seat, the hinge members 8 and 9 will again be locked in the newly selected position, the control arm 17 must be pushed forwardly after the handle 13 has been released until the lateral edge of ring segment 16′ will again abut against the finger 14.

If the back rest is to be adjusted to a new angular position forwardly of the position to which it was previously adjusted, it is first necessary to move the control arm 17 to its farthest rear position. When the back rest is then pivoted forwardly, shift rod 11 will not be locked in its releasing position because of slot 16″ so that the back rest may be secured in the desired new position. Finally, the control arm 10 should again be shifted forwardly up to its stop. It is, however, also possible at first not to actuate the control arm 17 when adjusting the back rest to a new angular position, but to pivot the latter forwardly to the desired new position when shift rod 11 is in its releasing position. As soon as the back rest is in its new position, it is only necessary to draw the control arm 17 toward the rear until the finger 14 again engages into the slot 16″ so that the locking members 8 and 9 will again interlock.

By moving the control arm 17 back up to its stop so that the disk 16 will be turned in the clockwise direction, as seen in FIGURE 1, until the upper ring segment 16′ abuts against the finger 14, it is possible to preserve the present angular position of the back rest for returning it thereto after it is swung back to the reclining position. When the back rest is then again pivoted forwardly from this reclining position, it will be automatically arrested in its original position. By a suitable adjustment of the control arm 17 it is also possible to preselect a new angular position of the back rest as long as the latter is still locked in its former position. For locking the back rest in the preselected position, it is first necessary to pivot it toward and beyond this position and then to pivot it in the opposite direction until it will be locked automatically in the preselected position.

FIGURES 4 and 5 illustrate a modification of the invention in which the hinge fitting which is to be secured to one side of a seat and back rest, not shown, comprises a lower hinge member 101 which is to be secured to the seat, and upper hinge member 102 which is to be secured to the back rest, and a hinge pin or axle 103 which is rigidly secured to the upper hinge member 102 and on which the lower hinge member 101 is pivotably mounted. As shown in FIGURE 5, hinge pin 103 is rotatably mounted within a cup-shaped bevel gear 108 which is an integral part of the lower hinge member 101 and provided with a set of inner bevel teeth 108′. This bevel gear 108 which forms a first locking member is adapted to be interengaged with and disengaged from another bevel gear 109 forming a second locking member which is provided with a corresponding set of inner bevel teeth 108. For engaging and disengaging the two locking members, the bevel gear 109 is axially slidable on but nonrotatable relative to the hinge pin 103 by means of a spline connection in the form of a set of inner gear teeth 103″ which are constantly in mesh with and slidable along a corresponding set of outer gear teeth on hinge pin 103. This locking mechanism may be operated by a tubular core member 110 which is axially slidable within a central bore 103′ in hinge pin 103. One end of this core member 110 is nonrotatably secured to the locking member 109 by means of a bracket 112, while the other end of a core member 110 facing toward the outside carries a handwheel 117 which is rotatably mounted thereon. Bore 103′ contains a coil spring 115 which tends to shift the core member 110 in the direction toward the outside so as to maintain the second locking member 109 in locking engagement with the first locking member 108 on the lower hinge member 101.

At the outer side of the upper hinge member 102 facing the hand wheel 117, a disk 118 is rotatably mounted on hinge pin 103 and nonrotatably connected to the lower hinge member 101 by means of a strap 119 which is rigidly secured to or integral with disk 118. Disk 118 is provided with a friction coating 120 which engages upon a disk 116 which is disposed coaxially to pin 110. On a part of its inner peripheral edge, this disk 116 is provided with an extension which is bent forwardly from the plane of disk 116 and then inwardly and parallel to this plane. This inwardly extending part forms a segment 116', as shown particularly in FIGURE 4, which is provided with an axially projecting tab 121.

Core member 110 carries a pin 114 which is disposed in such a position on the member 110 and projects therefrom in a radial direction for such a distance that, when the two hinge members 101 and 102 are locked to each other, pin 114 may abut against one end of segment 116' as indicated in FIGURE 4, while in the released position of hinge members 101 and 102, pin 114 may engage under the pressure of spring 115 upon the flat inner surface of segment 116'. The torque which during a pivoting movement of the back rest is normally transmitted by the frictional engagement between disks 116 and 118 without relative slipping is made of such a size that, when pin 114 is in the latching position in which it engages under the pressure of spring 115 against the inner side of segment 116', disk 116 will not be turned when pin 114 is turned by a turning of core member 110 so that pin 114 will then slide along the segment 116'. Tab 121 projects into a recess 117' in handwheel 117 so that, when the latter is turned, it will take along the segment 116' and ring 116.

When the back rest is to be pivoted forwardly, for example, from the position as shown in FIGURE 4, it is first necessary to press the handwheel 117 against the hinge fitting whereby core member 110 will be shifted in the axial direction against the action of spring 115. The axial movement of core member 110 will then be transmitted by bracket 112 to the locking member 109 so that its bevel teeth 109' will be disengaged from those on the other locking member 108. This axial movement of core member 110 also moves pin 114 which forms one of the latching members to a position in which it can slide along the inner side of the segment 116' which extends parallel to the disk 116. After the locking members 108 and 109 are disengaged from each other, the back rest may then be pivoted forwardly. Pin 114 will thereby be turned about the same angle as the back rest since core member 110 is nonrotatably connected to the hinge member 102 of the back rest by means of the bracket 112, the second locking member 109 and the hinge pin 103. As soon as the back rest has been pivoted very slightly, pin 114 will slide over the end of segment 116' and upon the inner side thereof so that for further pivoting the back rest, the operator no longer needs to manipulate the handwheel 117. Core member 110 then remains, however, arrested in its releasing position in which the hinge members 108 and 109 are disengaged from each other. Regardless of the extent to which the back rest is pivoted forwardly, it will again be locked in its original position when pivoted rearwardly since pin 114 will be pivoted about the same angle as the back rest and disk 116 will not be turned during this pivoting movement because of its frictional connection with disk 118. Consequently, as soon as the back rest is pivoted back to its original position, pin 114 will again slide off the end of the segment 116'. Since core member 110 is acted upon by spring 115, it will then be shifted automatically to its locking position in which the hinge members 101 and 102 will be rigidly locked to each other.

For pivoting the back rest to a new position toward the rear of the previous position, it is only necessary to depress the handwheel 117 until the back rest has arrived in the desired position. As soon as the handwheel is then released, the hinge fitting will be locked automatically. If this new position is to be registered for subsequently locking the back rest therein when it is again pivoted forwardly, it is only necessary—without pressing upon the handwheel 117—to turn the latter in the clockwise direction until it is stopped because the end of the segment 116' on disk 116, which is rotatable with handwheel 117 by the entry of tab 121 into the recess 117', abuts against pin 114. If the back rest is to be adjusted to a position in front of the registered position, the handwheel must first be turned sufficiently in the counterclockwise direction, as seen in FIGURE 4. When the handwheel 117 is thereafter depressed in the axial direction, the back rest may be pivoted forwardly to the desired position in which it will be locked automatically when the handwheel is released. It is, however, also possible first to depress the handwheel and then to pivot the back rest forwardly to the desired position in which it may then be locked by turning the handwheel in the counterclockwise direction until pin 114 slides off the segment 116'. In a similar manner it is also possible to register a certain angular position of the back rest when the latter is pivoted back to the reclining position.

By a suitable rotary adjustment of disk 116 it is further possible to preselect a new angular position of the back rest as long as the latter is still locked in its previous position. Such a preselection may be simplified by providing the handwheel 117 with a pointer-like projection 117' which is associated with a dial, not shown, on the strap 119. This dial may be provided with tangible marks which permit the operator to make a new adjustment by touch without looking upon the dial.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A hinge fitting for adjusting the inclination of the back rest of a seat, especially of a motor vehicle, comprising, in combination, a first and a second hinge member adapted to be secured to one side of the seat and back rest, respectively, a pivot member for pivotably connecting said hinge members to each other, means for locking said hinge members in a fixed position at different angles to each other, said means comprising a pair of locking members, resilient means for normally maintaining said locking members in a locking position in locking engagement with each other, a first of said locking members being rigidly secured to said first hinge member, the second locking member being operatively connected to one of said hinge members, a manually operated actuating member for moving said second locking member against the action of said resilient means from said locking position, in which said second locking member is in engagement with said first locking member, to a releasing position in which it is disengaged from said first locking member, a latching mechanism adapted to arrest said actuating member in its releasing position when the back rest while being pivoted enters an adjustable range forming a part of its total distance of movement, said latch mechanism being further adapted to release said actuating member so as to permit it under the action of said resilient means to lock said two locking members and thus said hinge members in a fixed position to each other when the back rest is moved in the direction opposite to that in which it was previously moved when said actuating member was arrested by said latch members and as soon as said back rest leaves said range, said latching mechanism comprising a control member, means for moving said control member for a distance in proportion to the pivoting movement of the back rest, a pair of operatively associated latch members movable at an angle to each other, one of said latch members being operatively connected to said actuating member and the other latch member being connected to one of said hinge members, and a control handle for manually moving said other latch member in the same direction in which, when the back rest is pivoted, at least one of said latch members will also be moved.

2. A hinge fitting as defined in claim 1, in which said other latch member comprises a rotatable disk, an annular member secured to said disk and having at least one gap in its peripheral direction, and means for operatively engaging said disk with one of said hinge members, said one of said latch members projecting from said actuating member and engaging into said gap when said actuating member is in said releasing position and being in frictional engagement with said annular member when said actuating member is in its locking position.

3. A hinge fitting as defined in claim 2, in which said disk is disposed concentrically to the axis of said pivot member.

4. A hinge fitting as defined in claim 2, in which said means for engaging said disk with said second hinge member comprises a frictional connection between said disk and said second hinge member, said annular member forming a cylindrical ring having at least said one gap therein, said control arm secured to said disk for manually turning the same, and means for pivotably mounting said actuating member on said first hinge member so that said one of said latch members projecting from said actuating member is movable within a plane extending substantially at right angles to the main surface of said disk.

5. A hinge fitting as defined in claim 4, further comprising a layer having a high coefficient of friction intermediate said disk and the part of said second hinge member facing said disk and rigidly secured to one of these parts for producing said frictional connection.

6. A hinge fitting as defined in claim 2, in which said one of said latch member projects radially from said actuating member, said actuating member and said disk being disposed concentrically to the axis of said pivot member, said actuating member being slidable in its axial direction and nonrotatably connected to said second hinge member, and a second disk secured to said second hinge member, the first mentioned disk being in frictional engagement with said second disk.

7. A hinge fitting as defined in claim 6, further comprising a layer having a high coefficient of friction intermediate the first-mentioned disk and said second disk and rigidly secured to one of said disks.

8. A hinge fitting as defined in claim 6, further comprising a handwheel rotatably mounted on the outer end of said actuating member and nonrotatably connected to said first-mentioned disk.

References Cited

UNITED STATES PATENTS

| | | | |
|---|---|---|---|
| 3,099,485 | 7/1963 | Beierbach | 297—373 |
| 3,051,526 | 8/1962 | Werner | 297—367 |

BOBBY R. GAY, Primary Examiner

DORIS L. TROUTMAN, Assistant Examiner

U.S. Cl. X.R.

16—146; 297—366